(12) United States Patent  
Thakkar et al.

(10) Patent No.: US 10,846,140 B2  
(45) Date of Patent: Nov. 24, 2020

(54) OFF-SITE BACKUP OF WORKLOADS FOR MULTI-TENANT CLOUD COMPUTING SYSTEM

(71) Applicant: VMware, Inc., Palo Alto, CA (US)

(72) Inventors: Sachin Thakkar, San Jose, CA (US); Venu Gopala Rao Kotha, Bangalore (IN); Sureshbabu Koyadan Chathoth, Bangalore (IN); Pooja Naik, Milpitas, CA (US); Umar Shaikh, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 412 days.

(21) Appl. No.: 15/690,245

(22) Filed: Aug. 29, 2017

(65) Prior Publication Data

US 2018/0060184 A1 Mar. 1, 2018

Related U.S. Application Data

(60) Provisional application No. 62/380,945, filed on Aug. 29, 2016.

(51) Int. Cl.
*G06F 9/00* (2006.01)
*G06F 9/50* (2006.01)
(Continued)

(52) U.S. Cl.
CPC ........ *G06F 9/5038* (2013.01); *G06F 9/45558* (2013.01); *G06F 9/461* (2013.01); *G06F 9/4881* (2013.01); *G06F 9/5077* (2013.01); *G06F 11/1448* (2013.01); *G06F 11/1451* (2013.01); *G06F 11/1461* (2013.01);
(Continued)

(58) Field of Classification Search
CPC ............ G06F 11/1402; G06F 11/1446; G06F 11/1448; G06F 11/1451; G06F 11/1458; G06F 11/1461; G06F 11/1464; G06F 16/113; G06F 16/182; G06F 2009/45562; G06F 2009/45575; G06F 2009/45583; G06F 2009/45595; G06F 2201/81; G06F 2201/815; G06F 2201/84; G06F 9/45558; G06F 9/461; G06F 9/4881; G06F 9/5077
See application file for complete search history.

(56) References Cited

U.S. PATENT DOCUMENTS

2004/0205206 A1* 10/2004 Naik ....................... H04L 29/06
                                                                 709/230
2005/0044289 A1*  2/2005 Hendel ................. G06F 3/0613
                                                                 710/33

(Continued)

*Primary Examiner* — Diedra McQuitery
(74) *Attorney, Agent, or Firm* — Patterson + Sheridan, LLP

(57) ABSTRACT

A system and method for backing up workloads for multiple tenants of a cloud computing system are disclosed. A method of backing up workloads for multiple tenants of a computing system, includes determining that a first tenant has elected to maintain a copy of backups in an off-site location and a second tenant has elected to not maintain a copy of backups in an off-site location, directing first backup data of the first tenant to a backup storage device within the computing system and to a backup storage device at the off-site location, and directing second backup data of the second tenant to the backup storage device within the computing system, and not to the backup storage device at the off-site location.

20 Claims, 6 Drawing Sheets

(51) Int. Cl.
*G06F 11/14* (2006.01)
*G06F 9/48* (2006.01)
*G06F 9/455* (2018.01)
*G06F 16/11* (2019.01)
*G06F 9/46* (2006.01)
G06F 16/182 (2019.01)

(52) U.S. Cl.
CPC ........ *G06F 11/1464* (2013.01); *G06F 16/113* (2019.01); *G06F 16/182* (2019.01); *G06F 2009/45562* (2013.01); *G06F 2009/45575* (2013.01); *G06F 2009/45583* (2013.01); *G06F 2009/45595* (2013.01); *G06F 2201/815* (2013.01); *G06F 2201/84* (2013.01)

(56) References Cited

U.S. PATENT DOCUMENTS

| | | | | |
|---|---|---|---|---|
| 2006/0053181 A1* | 3/2006 | Anand | ............... | G06F 11/0715 |
| 2012/0203742 A1* | 8/2012 | Goodman | ........... | G06F 11/1451 |
| | | | | 707/646 |
| 2014/0040579 A1* | 2/2014 | Kripalani | ................ | G06F 3/065 |
| | | | | 711/162 |
| 2015/0134618 A1* | 5/2015 | Teterin | ................ | G06F 11/1456 |
| | | | | 707/654 |

* cited by examiner

OFF-SITE BACKUP OF WORKLOADS FOR MULTI-TENANT CLOUD COMPUTING SYSTEM

CROSS-REFERENCE TO RELATED APPLICATION(S)

This application claims the benefit of U.S. Provisional Patent Application No. 62/380,945, filed Aug. 29, 2016, the entire contents of which are incorporated by reference herein.

BACKGROUND

A cloud computing system of a cloud provider has a large number of hosts supporting many, perhaps thousands, of virtual machines (VMs) to meet the requirements of its cloud customers. The cloud provider performs various services for its cloud customers including data protection service (DPS).

DPS is offered in several forms. The first is provided in the same cloud in which the VMs are provisioned. In this context, the "same cloud" means that high-speed local area network (LAN) connections are available between host computers of the VMs being backed up and a backup storage device that is storing the backup data. This first form of DPS is referred to herein as "on-site backups."

Another form of DPS is off-site backups. The main technical challenge with off-site backups is the slower network speed because the connections between the host computers of the VMs being backed up and the backup storage device are over a wide area network (WAN), such as the Internet.

A simplified solution for providing off-site backups is to duplicate the on-site backup storage. However, replicating the entire on-site backup storage is not efficient, because some customers (hereinafter also referred to as "tenants") that have on-site backups enabled may be satisfied with on-site backups and may not be interested in off-site backups. Another simplified solution is to keep backup images for customers interested in off-site backups in a separate storage and replicate just that storage. However, benefits from deduplication would not be fully enjoyed by the cloud provider if the deduplication backup server is backing up data of only some customers and not all customers.

SUMMARY

One or more embodiments provide techniques for off-site backup of workloads for tenants in a multi-tenant cloud computing environment. A method of backing up workloads for multiple tenants of a computing system, according to an embodiment, includes determining that a first tenant has elected to maintain a copy of backups in an off-site location and a second tenant has elected to not maintain a copy of backups in an off-site location, directing first backup data of the first tenant to a backup storage device within the computing system and to a backup storage device at the off-site location, and directing second backup data of the second tenant to the backup storage device within the computing system, and not to the backup storage device at the off-site location.

Further embodiments include a non-transitory computer-readable storage medium that includes instructions for a processor to carry out the above method, and a computer system that includes a processor programmed to carry out the above method.

DETAILED DESCRIPTION

In the embodiments disclosed herein, a virtual machine is described as an example of a workload that is backed up. In general, a "workload" is some or all of the data specified in a tenant's SLA as requiring a backup. A workload may be a file, an object, a virtual machine, or a consistency group. An object is a group of files that must be backed up together as a single workload, such as for example, user mailboxes of an exchange server associated with a tenant. A consistency group is a group of virtual machines that must be backed up together as a single workload, such as for example, a group of virtual machines needed to execute a particular application.

Figure 1:
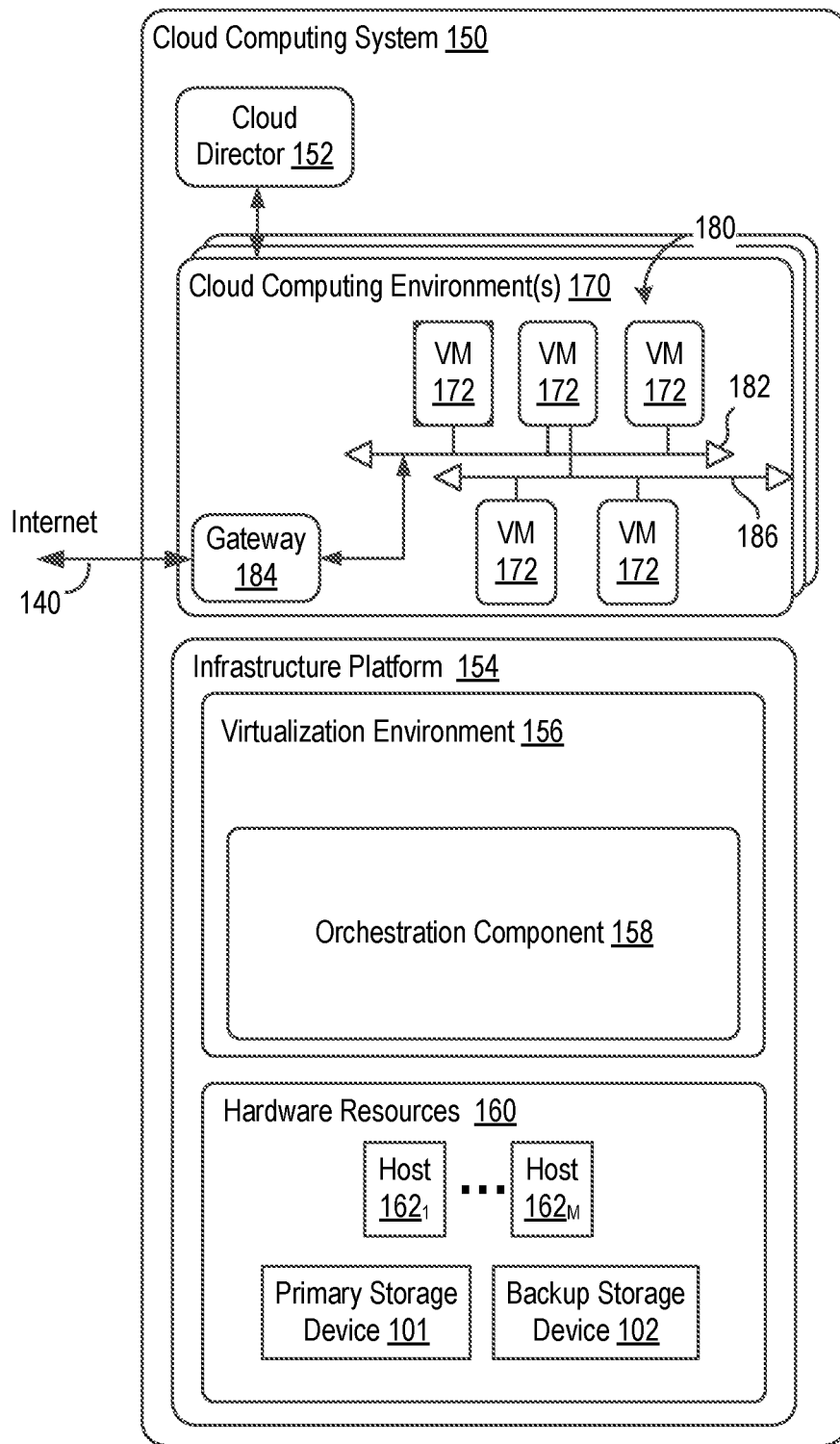
FIG. 1 is a block diagram of a cloud computing system in which embodiments may be practiced.

FIG. 1 is a block diagram of a cloud computing system 150 in which one or more embodiments may be utilized. Cloud computing system 150 is configured to dynamically provide an enterprise (or users of an enterprise) with one or more virtual data centers 170 in which a user may provision VMs 172, deploy multi-tier applications on VMs 172, and/or execute workloads. Cloud computing system 150 includes an infrastructure platform 154 upon which a cloud computing environment 170 may be executed.

In the particular embodiment of FIG. 1, infrastructure platform 154 includes hardware resources 160 having computing resources (e.g., hosts $162_1$ to $162_N$), storage resources including primary storage device 101 and backup storage device 102, and networking resources, which are configured in a manner to provide a virtualization environment 156 that supports the execution of a plurality of virtual machines 172 across hosts 162.

Each cloud computing environment 170 is associated with a particular tenant of cloud computing system 150. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired.

In one embodiment, cloud computing system 150 may include a cloud director 152 (e.g., running in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing.

According to embodiments, orchestration component 158 triggers a backup to be performed by a data protection server according to the SLAs of the tenants. As part of the backup SLA, each tenant defines: (1) retention period (for how many days the backed up data must be retained); (2) time window in which backup will run automatically; and (3) recurrence policy (how frequently the backup should run: daily, weekly, or monthly). Violation of any of these policies would result in violation costs for the cloud provider.

Figure 2:
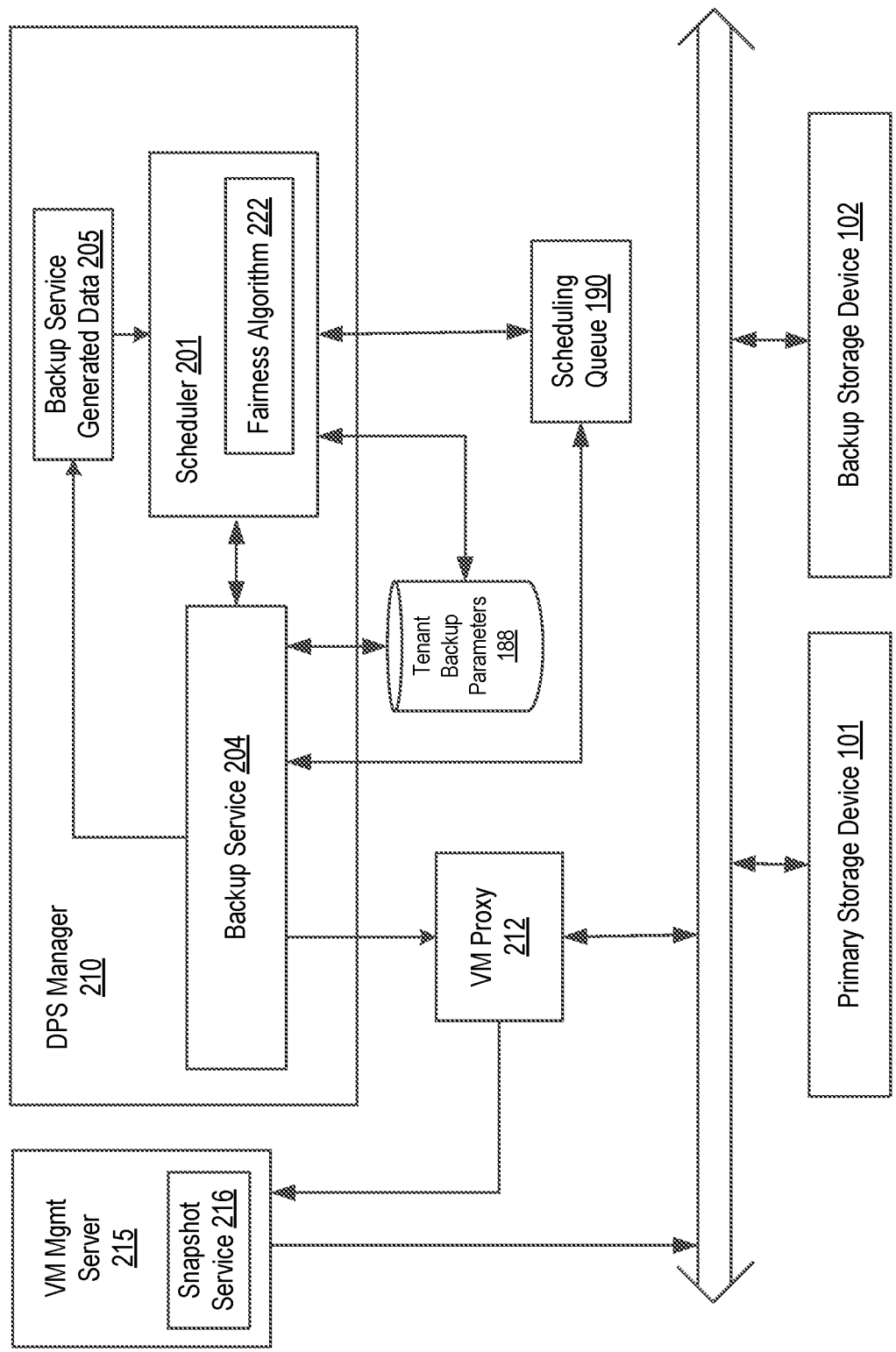
FIG. 2 is a schematic diagram that depicts a backup process for a plurality of VMs running in the cloud computer system.

FIG. 2 is a schematic diagram that depicts a backup process for a plurality of VMs running in the cloud computer center, when the backup is triggered by orchestration component 158. In one embodiment, the backup process depicted in FIG. 2 is carried out by a data protection service (DPS) manager 210 in conjunction with a VM management server 215, both of which are parts of orchestration component 158 of cloud computing system 150. DPS manager 210 includes a scheduler 201 that schedules backups of a tenant according to a fairness algorithm, which is further described below, which takes into account tenant's backup parameters 188, such as SLA data, and backup service generated data 205, which is further described below. DPS manager 210 further includes a backup service 204 that coordinates backup operations with one or more backup agents running in hosts 162. In one embodiment, the backup agent is a VM running in hosts 162, and is referred to herein as a VM proxy.

Tenant's backup parameters 188 specify attributes of VMs that are to be backed up, such as frequency, time window for the backup, and the SLA, where a higher SLA means higher priority and higher costs for violating the SLA. Other attributes include history information such as the number of recent backup attempts, failures, and successes, and one or more of the following:

(1) Application consistency group;
(2) Mandate for daily backup;
(3) Mandate for weekly offsite replicas;
(4) Both (2) and (3); and
(5) Backup within a time window of 2 am to 4 am, and if that fails, backup from 7 pm to 9 pm.

Figure 3:
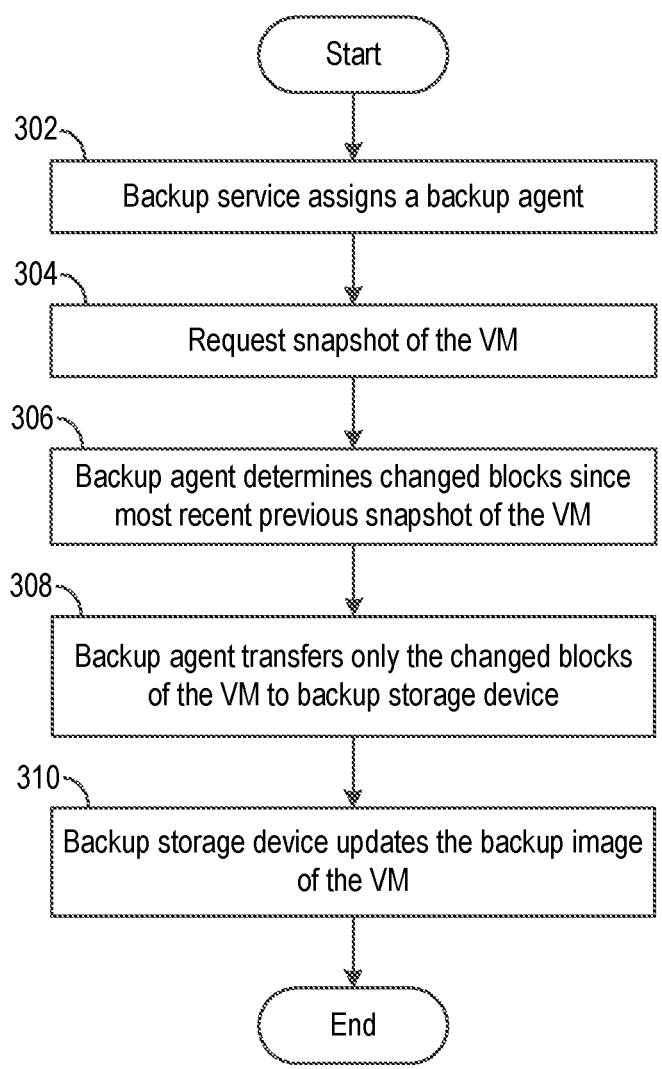
FIG. 3 is a flow diagram depicting a backup process for an individual VM according to an embodiment.

FIG. 3 depicts a backup process 300 for an individual VM according to an embodiment. To perform the backup, in step 302, backup service 204 assigns a backup agent (e.g., one of the virtual machines, VM proxy 212) for the VM to be backed up. In response, the backup agent communicates with a snapshot service 216 in VM management server 215 to take a backup snapshot of the VM. Snapshot service 216 takes the backup snapshot of the VM in step 304. Then, VM proxy 212 in step 306 determines data blocks of the VM that have changed since the most recent previous backup snapshot, and in step 308 updates the backup image of the VM in backup storage 102 with the changed blocks determined in step 306.

During the backup process, backup service 204 generates data (referred to herein as backup service generated data 205) which are used by scheduler 201 to place backups in scheduling queue 190. Backup service generated data 205 includes (a) a predicted total backup time for each VM needing backup during the next scheduling window, (b) a predicted SLA violation cost (cost metric) for each VM if not backed up, and (c) a number of system constraints, which reflect limitations in the data center. System constraints include the following:

Maximum number of possible IO connections supported by the backup server;
Maximum IO read and write rates supported by the backup server;
Maximum IO reads of the primary storage;

Network bandwidth between the primary storage and the backup storage;

CPU cycles available on the backup server;

CPU cycles available on the hosts; and

Maximum threads supported by the backup agent.

It is desirable to maximize the number of VMs backed up and reduce or eliminate the service agreement violations without expanding the resources of cloud computing system 150, which requires additional infrastructure costs.

In a multi-tenant cloud computing system, different tenants that have enabled backups will have an associated RTO and RPO for their backups (and stored as part of tenant backup parameters 188) and it will be up to DPS manager 210 to perform the backups in accordance with the tenant RTOs and RPOs. In addition, the tenants may set a time window (e.g., 2 AM to 4 AM) and additional parameters (such as frequency, daily, weekly, monthly) for performing the backups, e.g., during off-peak hours. However, because one tenant sets its backup schedule and additional parameters without knowledge of backup schedules and additional parameters set by other tenants, the backup schedules and/or the additional parameters may conflict such that it might not be possible to satisfy all of the backup requirements of all tenants of the cloud computing system.

According to embodiments, a fairness algorithm implemented in scheduler 201 accounts for backup schedules and additional parameters set by all tenants who have enabled backups, and hard/physical resource and network constraints, to schedule the backups of multiple tenants. Consequently, multiple tenants may share the same physical storage array for storing backups, and the advantages offered by deduplication backup servers can be continued to be leveraged by the cloud computing system. As known in the art, "deduplication" is a process that allows efficient use of storage space. Typical computer file systems store file data in small, fixed-size blocks, referred to by pointers maintained in metadata associated with each file. In the event two pointers refer to identical blocks, some storage capacity can be reclaimed by changing one or both pointers so that they refer to the same block. The process of finding pointers that refer to identical blocks and then changing one or both pointers so that they point to the same block is known as "deduplication."

In one embodiment, the hardware constraints that the fairness algorithm takes into account include storage capacity of backup storage device 102, input/output operations per second (IOPS) of backup storage device 102, and concurrency of backup storage device 102 (which represents the rate data can be ingested by the backup server). Based on these constraints (and in some embodiments, other constraints including the system constraints listed above), the fairness algorithm determines whether to schedule a backup at the client specified time or not. In cases where a VM that is backed up goes down, the fairness algorithm gives priority to recovery or restoring of that VM over any scheduled backups.

FIG. 3 describes the use of snapshots to determine incremental changes to VMs and performs backups of only the changed blocks of the VMs. In another embodiment, backup service 204 does not rely on snapshot manager 215. Instead, backup service 204 quiesces IOs of the VM prior to backing up that VM and transmits the entire image of that VM to backup storage device 102 for storage therein. After receiving acknowledgment from backup storage device 102 that the entire image of the VM has been stored in backup storage device 102, backup service 204 resumes the IOs of the VM.

Figure 4:
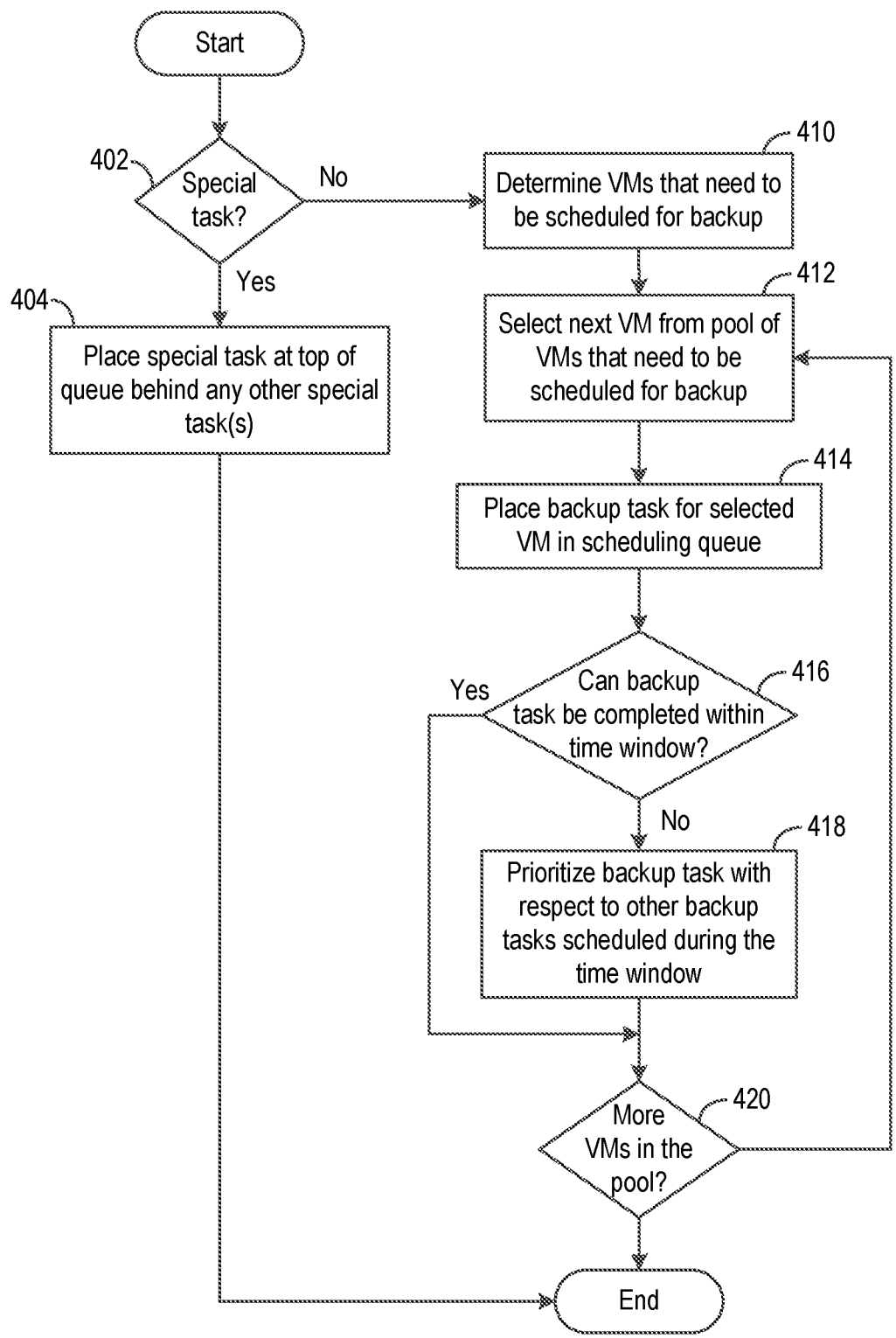
FIG. 4 is a flow diagram depicting a process for scheduling a task to be carried out by a backup storage device according to an embodiment.

FIG. 4 is a flow diagram that depicts a process for scheduling (by scheduler 201) a task to be carried out by backup storage device 102, according to an embodiment. The process is triggered by a request for a special task, such as recovery or restoring of a VM that went down or a backup demanded by a tenant to be carried out immediately. The process is also triggered periodically at the beginning of a time window for performing backups by backup storage device 102 so that scheduling queue 190 can be prepared for consumption by backup storage device 102 during the time window.

The process depicted in FIG. 4 begins in step 402, where scheduler 201 determines whether or not the task to be scheduled is a special task. Two types of special tasks are described herein. The first is a task to recover or restore a VM from a backup image of the VM stored by backup storage device 102. The second is a backup task that a tenant has demanded to be carried out immediately. In one embodiment, these on-demand backups are treated as tiered sales, requiring the tenant to pay a premium for such backups. If the task is determined to be a special task in step 402, scheduler 201 places the special task in scheduling queue 190 ahead of all non-special tasks, such a normal backup tasks, and behind other special tasks that scheduler 201 may have placed in scheduling queue 190 at an earlier time.

If the task is determined not to be special task in step 402, which means that the process is being triggered to prepare scheduling queue 190 for consumption by backup storage device 102, scheduler 201 in step 410 determines a pool of VMs that are to be backed up during the time window. For example, if the time window is from 2 AM to 4 AM, the process of FIG. 4 would be triggered at 2 AM. As described above, scheduler 201 obtains information about which VMs are to be backed up during the time window (e.g., 2 AM to 4 AM) from tenant backup parameters 188. In addition to the VMs that are designated in tenant backup parameters 188 to be backed up during the time window, there may be other VMs that have been added to the pool, e.g., VMs that were scheduled to be backed up during a prior time window but could not be backed up within that prior time window. For example, if a VM is scheduled to be backed up on a weekly basis, every Monday 2 AM to 4 AM, and the VM could not be backed up on a particular Monday 2 AM to 4 AM, the VM may be added to the pool of VMs being backed up on the following Tuesday 2 AM to 4 AM. Alternatively, such a VM may be added to the pool of VMs being backed up during the time window directly following Monday 2 AM to 4 AM, which would be Monday 4 AM to 6 AM. In addition, VMs in the pool may belong to different tenants. In one embodiment, some of the VMs in the pool belong to a first tenant, e.g., AAA Inc., and some of the VMs in the pool belong to a second tenant, BBB Corp.

After the pool of VMs to be backed up during the time window are identified in step 410, scheduler 201 executes steps 412, 414, 416, 418 (if needed), and 420 for each VM in the pool. Each of steps 412, 414, 416, 418, and 420 is further described below.

In step 412, scheduler 201 selects one of the VMs in the pool that has not yet been scheduled. Then, scheduler 201 places a backup task for backing up the selected VM in scheduling queue 190. The priority given to the backup task in the queue may be computed according to any technically feasible technique that takes into account one or more of the following attributes of the VM to be backed up: SLA, cost in violating the SLA, size of VM data to be updated, consistency group of the VM (because other VMs within the same consistency group will need to be backed up to provide a consistent backup state), and time of last backup.

In step 416, scheduler 201 evaluates, based on the system constraints contained in the backup service generated data 205 and the size of the VM data to be updated, whether the backup task being added can be completed on time. If so, scheduler 201 places the backup task in scheduling queue 190. If not, scheduler 201 performs a prioritization of the backup tasks in scheduling queue 190 including the backup task being added in step 418. Prioritization in this context means ordering of the backup tasks within scheduling queue 190 based on the priority given thereto. If the same priority is given to two or more backup tasks, the ordering is carried out in one embodiment according to a first-come, first-served model.

In step 420, scheduler 201 determines if backup task for all VMs in the pool have been scheduled. If not, the flow returns to step 412. If so, the process ends.

At the beginning of a time window, backup service 204 begins executing backup tasks that are ordered in scheduling queue 190, beginning from the head of the queue and then working its way down the queue towards the tail. Any backup tasks for VM not completed within the time window are disposed according to a policy of the tenant owning that VM, which is defined in tenant backup parameters 188. For example, tenant AAA Inc. may specify any such backup tasks to be scheduled again in the immediately following time window, whereas BBB Corp. specify any such backup tasks to be scheduled again the following day during the same time window.

Backup service 204 executes backup tasks in the manner described above in conjunction with FIG. 3. The number of concurrent backup tasks that backup service 204 executes depends on the hardware constraints of backup storage device 102.

Figure 5:
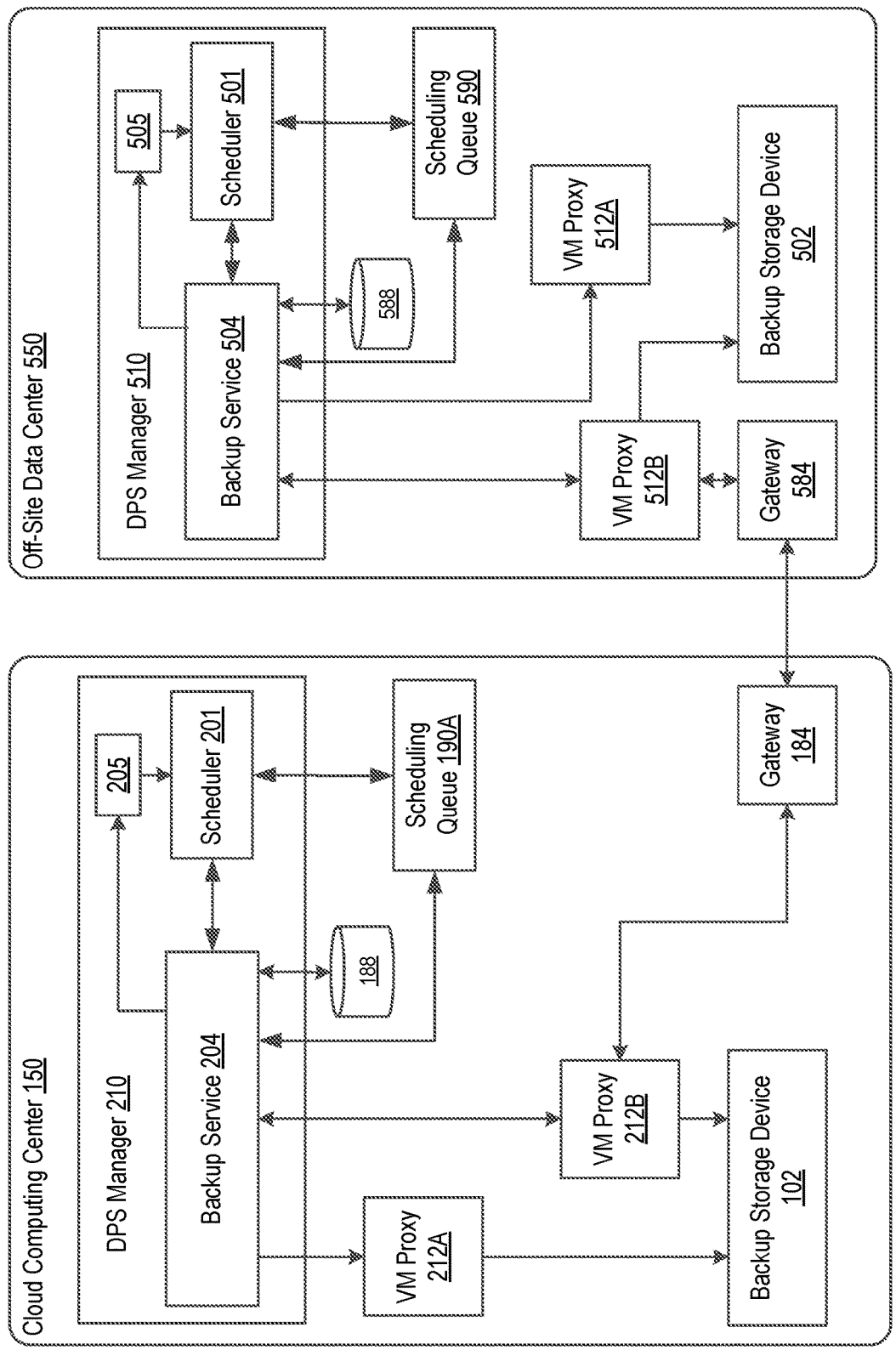
FIG. 5 is a schematic diagram depicting an off-site backup process according to an embodiment.

FIG. 5 is a schematic diagram depicting an off-site backup process according to an embodiment. FIG. 5 illustrates client computing center 150 and depicts VM proxy 212A provisioned as a backup agent for tenant A and VM proxy 212B provisioned as a backup agent for tenant B. In the embodiment illustrated in FIG. 5, VM proxy 212A executes an on-site backup process only, whereas VM proxy 212B executes both an on-site backup process and an off-site backup process.

As with on-site backups, scheduler 201 performs scheduling of off-site backups according to a fairness algorithm that takes into account tenant's backup parameters 188 and backup service generated data 205. It should be recognized that some of the system constraints, reflected in backup service generated data 205, are relevant for scheduling on-site backups but are not relevant for scheduling off-site backups, and vice versa. Thus, the fairness algorithm of scheduler 201 considers only those system constraints that are relevant for off-site backups. One key system constraint relevant for off-site backups is network bandwidth.

Similarly, tenant's backup parameters 188 specify attributes that are relevant for off-site backups. One such attribute is, of course, one that designates a VM for off-site backups. Other attributes relevant for off-site backups include an IP address of one or multiple off-site locations at which off-site backup for the designated VM is to be carried out, and a time window and frequency for performing the off-site backup. In one embodiment, tenant's backup parameters 188 indicate the following:

VM_1 of Tenant A: back up on weekly during time window of 2 AM to 4 AM, on-site and at one of two off-site locations;

VM_2 of Tenant B: back up daily during a time window of 4 AM to 6 AM, on-site only; and VM_3 of Tenant C: back up monthly during any time window, on-site and at one off-site locations; and VM_4 of Tenant C: back up daily during any time window, on-site only.

The process depicted in FIG. 4, which is described for scheduling on-site backups, is applicable to off-site backups. However, when scheduling off-site backups, the scheduled off-site backup tasks are stored in a different scheduling queue, which is depicted in FIG. 5 as scheduling queue 190A. Then, at the beginning of the relevant time window, backup service 204 begins executing off-site backup tasks that are ordered in scheduling queue 190A, beginning from the head of the queue and then working its way down the queue towards the tail. Any off-site backup tasks for VM not completed within the time window are disposed according to a policy of the tenant owning that VM, which is defined in tenant backup parameters 188. For example, tenant A may specify any such off-site backup tasks to be scheduled again in the immediately following time window, whereas tenant B may specify any such off-site backup tasks to be scheduled again the following day during the same time window.

Backup service 204 executes off-site backup tasks in the manner described above in conjunction with FIG. 6. The number of concurrent off-site backup tasks that backup service 204 executes depends on the hardware constraints of gateway 184.

Figure 6:
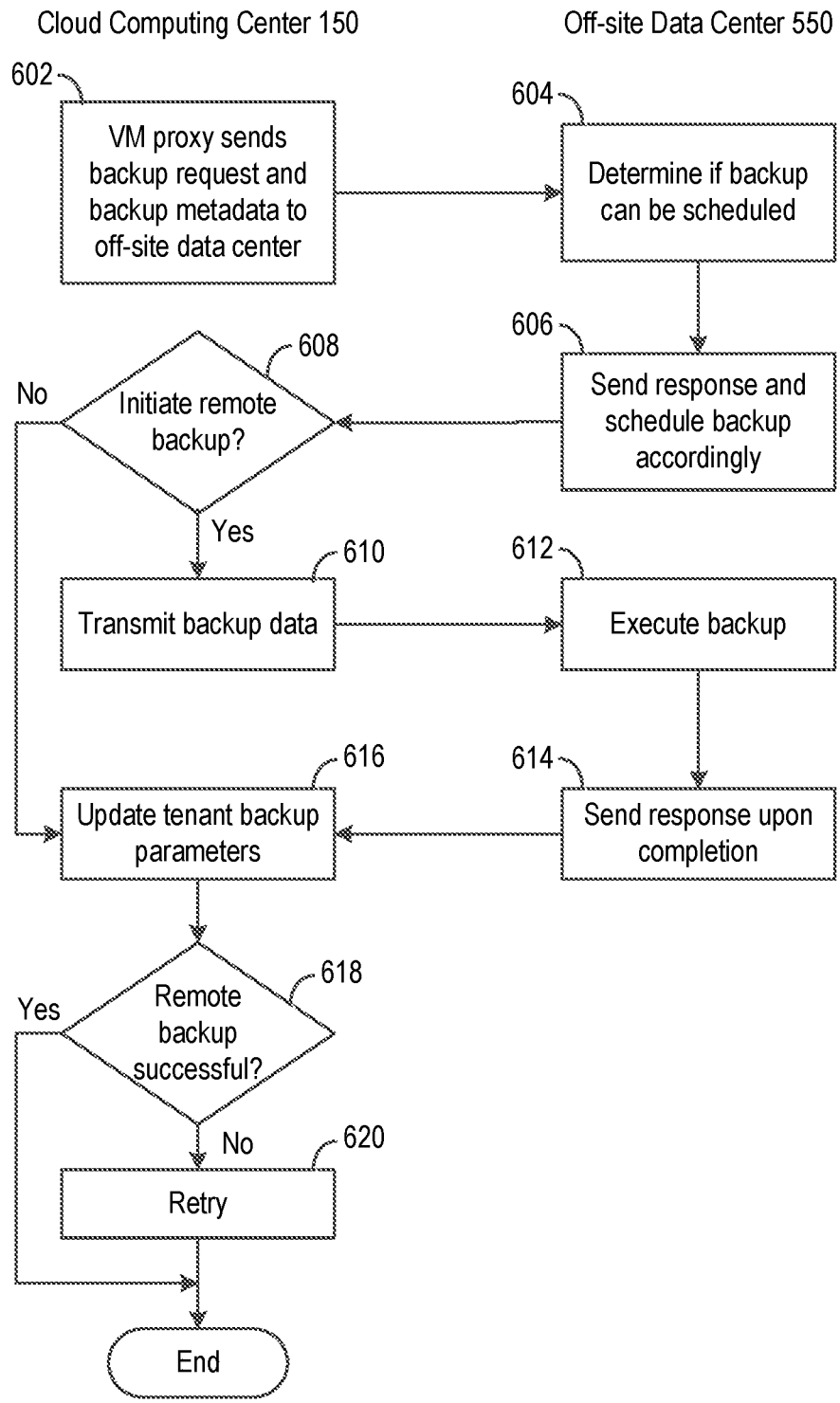
FIG. 6 is a flow diagram depicting an off-site backup process according to an embodiment.

FIG. 6 is a flow diagram depicting an off-site backup process according to an embodiment. The off-site backup process includes a process executed at two sites. The first site is cloud computing center 150 and the second site is off-site data center 550. The process of FIG. 6 begins in step 602 with VM proxy that is executing an off-site backup process, e.g., VM proxy 212B in FIG. 5, sending a backup request and backup metadata to off-site data center. The backup metadata contains the parameters for performing the backup, such as size of the VM data to be backed up (which may be the size of the entire VM or only the data blocks of the VM that have changed since the last successful backup at off-site data center 550) and time window within which the backup should be completed. Upon receipt of the backup request and backup metadata through gateway 584, VM proxy 512B, which has been provisioned within off-site data center 550 for handling backup requests received through gateway 584, forwards the backup request and the backup metadata to DPS manager 510, which manages on-site backups for off-site data center 550 (e.g., in the same manner as DPS manager 210 manages on-site backups for cloud computing center 150). DPS manager includes backup service 504 (which operate in the same manner as backup service 204) and scheduler 501 (which operate in the same manner as backup service 204). Upon receipt of the backup request and the backup metadata, backup service 504 invokes scheduler 501 in step 604 to determine if the requested backup can be scheduled. If so, in step 606, scheduler 501 inserts a backup task for the requested backup in scheduling queue 590 and sends a response indicating that the requested backup has been scheduled. If not, scheduler 501 sends a response indicating that the requested backup could not be scheduled.

In determining whether or not the requested can be scheduled, scheduler 501 references backup service generated data 505 (which contains the same type of information as backup service generated data 205, except backup service generated data 505 is generated by backup service 504 and reflects system constraints of off-site data center 550), and tenant's backup parameters 588 (which contains backup parameters specified by tenants of off-site data center 550). Consequently, the requested backup has to be scheduled among the on-site backups requested by tenants of off-site data center 550 during the requested time window. For illustration, one such backup is shown as being handled by VM proxy 512A.

VM proxy 212B in step 608 evaluates the response from off-site data center 550 to determine if it can initiate the backup. If the response indicates that the requested backup has been scheduled (step 608, Yes), VM proxy 212B transmits backup data to off-site data center in step 610. On the other hand, if the response indicates that the requested backup could not be scheduled (step 608, No), VM proxy 212B forwards this response to backup service 206, which updates tenant backup parameters 188 to reflect that the off-site backup was unsuccessful.

VM proxy 512B buffers the backup data transmitted by VM proxy 212B and at a time designated by backup service 504, VM proxy 212B instructs backup storage device 502 to store the backup data therein. Then, VM proxy 512B in step 614 sends a "success" completion response to VM proxy 212B if all of the backup data were successfully stored in backup storage device 502 within the scheduled time window, and a "failed" completion response to VM proxy 212B if all of the backup data were not successfully stored in backup storage device 502 within the scheduled time window.

VM proxy 212B forwards the completion response to backup service 204, which updates tenant backup parameters 188 to indicate whether or not the off-site backup was successful. Then, in step 618, backup service 204 determines whether or not the off-site backup service was successful. If successful, the process ends. On the other hand, if unsuccessful, backup service 204 requests a retry of the off-site backup. The request for the retry may be made to the same off-site data center 550 at a later time, e.g., a backup time window specified in tenant backup parameters 188, or to a different off-site data center 550 (wherein locations of one or more different off-site data centers are defined in tenant backup parameters 188) immediately or at a later time. In some embodiments, after a certain number of failed off-site backup attempts, no future backup attempt is scheduled. Rather, the system administrator and/or tenant are notified.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of backing up workloads for multiple tenants of a computing system, comprising:

determining, based on first backup parameters of a first tenant, that the first tenant has elected to maintain a copy of backups in an off-site location;

determining, based on second backup parameters of a second tenant, that the second tenant has elected to not maintain a copy of backups in an off-site location;

scheduling, at a first time, a first task for backing up first backup data of the first tenant to a backup storage device within the computing system and not to a backup storage device at the off-site location as indicated by the first backup parameters, the scheduling of the first task based on a first task priority computed according to the first backup parameters being lower than one or more task priorities associated with one or more other tasks performed at the first time;

scheduling, at the first time or another time, a second task for backing up second backup data of the second tenant to the backup storage device within the computing system, and not to the backup storage device at the off-site location, the scheduling of the second task based on a second task priority computed according to the second backup parameters; and scheduling, at a second time subsequent to the first time, a third task for backing up the first backup data to a backup storage device at the off-site location as indicated by the first backup parameters.

2. The method of claim 1, further comprising:
transmitting metadata of the first backup data to the off-site location to request a backup of the first backup data to be scheduled at the off-site location; and after receiving a confirmation that the backup is scheduled, transmitting the first backup data to the off-site location.

3. The method of claim 2, wherein the metadata includes a time window for scheduling the backup of the first backup data at the off-site location, and the first backup data is transmitted to the off-site location at a start of the time window.

4. The method of claim 3, further comprising:
receiving a response from the off-site location indicating that the backup of the first backup data was successful; and upon receiving the response, updating the first backup parameters to indicate that the backup at the off-site location was successful.

5. The method of claim 3, further comprising:
receiving a response from the off-site location indicating that the backup of the first backup data was not successful; and upon receiving the response, updating the first backup parameters to indicate that the backup at the off-site location was not successful, and transmitting another request for the backup to be scheduled at a later time window to the off-site location.

6. The method of claim 3, further comprising:
receiving a response from the off-site location indicating that the backup of the first backup data was not successful; and upon receiving the response, updating the first backup parameters to indicate that the backup at the off-site location was not successful, and transmitting another request for the backup to be scheduled at a later time window to a different off-site location.

7. A non-transitory computer readable medium comprising instructions to be executed in a computer for managing backups of workloads for multiple tenants of a computing system, wherein the instructions when executed in the computer cause the computer to carry out steps including:

determining, based on first backup parameters of a first tenant, that the first tenant has elected to maintain a copy of backups in an off-site location;

determining, based on second backup parameters of a second tenant, that the second tenant has elected to not maintain a copy of backups in an off-site location;

scheduling, at a first time, a first task for backing up first backup data of the first tenant to a backup storage device within the computing system and not to a backup storage device at the off-site location as indicated by the first backup parameters, the scheduling of the first task based on a first task priority computed according to the first backup parameters being lower than one or more task priorities associated with one or more other tasks performed at the first time;

scheduling, at the first time or another time, a second task for backing up second backup data of the second tenant to the backup storage device within the computing system, and not to the backup storage device at the off-site location, the scheduling of the second task based on a second task priority computed according to the second backup parameters; and scheduling, at a second time subsequent to the first time, a third task for backing up the first backup data to a backup storage device at the off-site location as indicated by the first backup parameters.

8. The non-transitory computer readable medium of claim 7, the steps further comprising:
transmitting metadata of the first backup data to the off-site location to request a backup of the first backup data to be scheduled at the off-site location; and after receiving a confirmation that the backup is scheduled, transmitting the first backup data to the off-site location.

9. The non-transitory computer readable medium of claim 8, wherein the metadata includes a time window for scheduling the backup of the first backup data at the off-site location, and the first backup data is transmitted to the off-site location at a start of the time window.

10. The non-transitory computer readable medium of claim 9, the steps further comprising:
receiving a response from the off-site location indicating that the backup of the first backup data was successful; and upon receiving the response, updating the first backup parameters to indicate that the backup at the off-site location was successful.

11. The non-transitory computer readable medium of claim 9, the steps further comprising:
receiving a response from the off-site location indicating that the backup of the first backup data was not successful; and upon receiving the response, updating the first backup parameters to indicate that the backup at the off-site location was not successful, and transmitting another request for the backup to be scheduled at a later time window to the off-site location.

12. The non-transitory computer readable medium of claim 9, the steps further comprising:
receiving a response from the off-site location indicating that the backup of the first backup data was not successful; and upon receiving the response, updating the first backup parameters to indicate that the backup at the off-site location was not successful, and transmitting another request for the backup to be scheduled at a later time window to a different off-site location.

13. The non-transitory computer readable medium of claim 9, the steps further comprising:
transmitting metadata of the first backup data to the off-site location to request a backup of the first backup data to be scheduled at the off-site location; and
after receiving a confirmation that the backup could not be scheduled, transmitting another request for the backup to be scheduled at a later time window to the off-site location.

14. The non-transitory computer readable medium of claim 9, the steps further comprising:
transmitting metadata of the first backup data to the off-site location to request a backup of the first backup data to be scheduled at the off-site location; and
after receiving a confirmation that the backup could not be scheduled, transmitting another request for the backup to be scheduled at a later time window to a different off-site location.

15. A computing system comprising:
a plurality of computers in each of which virtual machines are running, the virtual machines including virtual machines for a first tenant and virtual machines for a second tenant; and
a backup storage device configured to store backup images of the virtual machines for both the first tenant and the second tenant, wherein
one of the computers has running therein a data protection service that performs the steps of:
determining, based on first backup parameters of a first tenant, that the first tenant has elected to maintain a copy of backups in an off-site location;
determining, based on second backup parameters of a second tenant, that the second tenant has elected to not maintain a copy of backups in an off-site location;
scheduling, at a first time, a first task for backing up first backup data of the first tenant to the backup storage device and not to a backup storage device at the off-site location as indicated by the first backup parameters, the scheduling of the first task based on a first task priority computed according to the first backup parameters being lower than one or more task priorities associated with one or more other tasks performed at the first time;
scheduling, at the first time or another time, a second task for backing up second backup data of the second tenant to the backup storage device, and not to the backup storage device at the off-site location, the scheduling of the second task based on a second task priority computed according to the second backup parameters; and
scheduling, at a second time subsequent to the first time, a third task for backing up the first backup data to a backup storage device at the off-site location as indicated by the first backup parameters.

16. The computing system of claim 15, wherein the backup storage device is configured to perform deduplication of all data stored thereby, including virtual machine data of the first tenant and virtual machine data of the second tenant.

17. The computing system of claim 15, wherein one of the virtual machines operates as a backup agent for preparing virtual machine data to be backed up.

18. The method of claim 1, wherein:
both of the first backup parameters and the second backup parameters include a service level agreement (SLA) of the corresponding tenant; and
both the first task priority and the second task priority are computed according to the SLA of the corresponding tenant.

19. The method of claim 1, wherein:
scheduling the first task and the third task comprises assigning a first backup agent configured to execute the first task and the third task; and
scheduling the second task comprises assigning a second backup agent to execute the second task.

20. The method of claim 1, wherein:
scheduling the first task and the second task comprises storing the first task and the second task in a first scheduling queue in an order according to the first task priority and the second task priority; and
scheduling the third task comprises storing the third task in a second scheduling queue according to a first-in first-out (FIFO) model.

* * * * *